Oct. 10, 1939. W. STEINEN 2,175,709
DRESSER SET UTENSIL
Filed Nov. 12, 1936
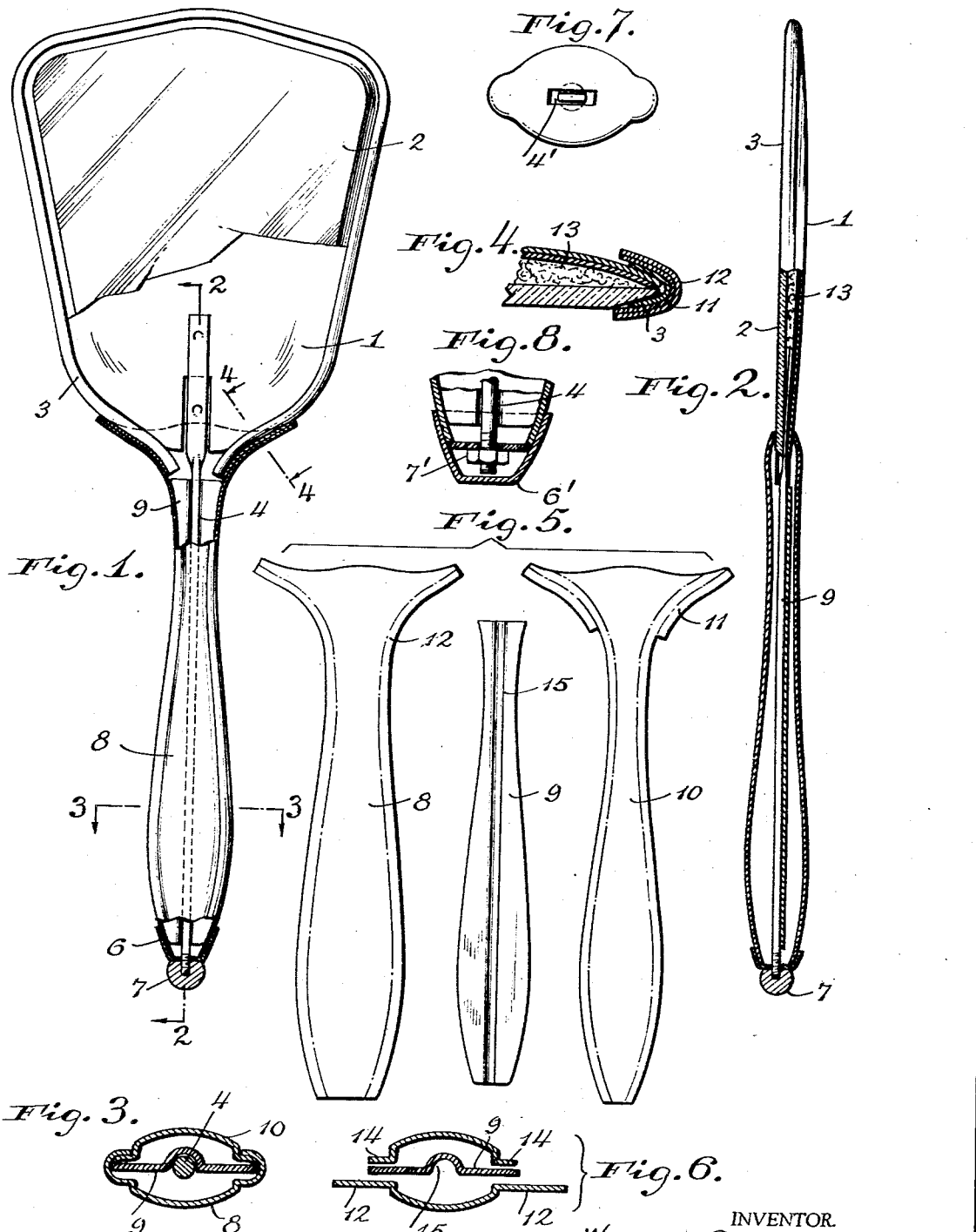
INVENTOR.
WILLIAM STEINEN
BY
Richards & Geier
ATTORNEYS Patented Oct. 10, 1939

2,175,709

UNITED STATES PATENT OFFICE 2,175,709

DRESSER SET UTENSIL

William Steinen, South Orange, N. J.

Application November 12, 1936, Serial No. 110,433

1 Claim. (Cl. 88—102)

The present invention relates to vanity mirrors, brushes and the like.

The common practice followed in manufacturing handles of this type has been to use two symmetrical shells shaped to form the contour lines of the handle. These two shells when positioned face-to-face were butt soldered into a unitary handle construction. This type of construction was found to have serious drawbacks, especially as regards the factors of expense and appearance. It was found that the handle was no stronger than the soldered seam which connected together the two symmetrical shells of the handle member. It was also found necessary to finish the soldered seam in order to give a pleasing appearance to the final product. The soldering of the seam and the finishing of the handle thus entailed considerable expense. The construction of my handle, which eliminates the soldering step, enables construction of a handle which is pleasing in appearance and less expensive to manufacture.

The present invention does away with all soldering by the use of a "dry seam" formed by having overlapping edges on the face-to-face shells, which when assembled, form the handle member. This form of construction gives a rugged handle, pleasing in appearance, which can withstand the uses to which it is put.

Another feature of construction of the present invention lies in the particular construction at the throat of the handle; that portion of the handle which attaches to the mirror or brush proper. This obviously is a weak spot in the structural organization and in order to lend strength at this particular point a double lap construction has been employed.

Other objects and advantages will appear and be evident as the description proceeds.

The invention is illustrated in the accompanying drawing in which:

Fig. 1 is a front elevational view, partly in section, of the invention as applied to the familiar vanity mirror;

Fig. 2 is a side elevation, partly in section through plane 2—2 of Fig. 1, illustrating the association of the handle with the mirror proper;

Fig. 3 is a sectional view to show the interior construction of the handle as taken through the plane 3—3 of Fig. 1;

Fig. 4 is a detail sectional view through the plane 4—4 of Fig. 1 to illustrate details of the throat construction;

Fig. 5 is a view in elevation showing the relative position of the two handle halves and the reinforcing member before assembly;

Fig. 6 is a view similar to Fig. 3 showing the parts before assembly;

Fig. 7 is a detail view of a modification of the handle take-up means; and

Fig. 8 is a detail view of a modification of the take-up means completely concealed within the handle structure.

Like numerals refer to like parts throughout the several views.

The general organization of structure of the vanity mirror comprises a mirror back 1, a mirror 2 and a handle construction 8. The mirror 2 is held firmly in place against the back 1 by the aid of channel rim 3 which extends about the periphery of the mirror 2 and mirror back 1. This channel rim 3 is substantially V-shaped in cross section, as shown in Fig. 4, and extends to the base of the mirror where the two ends of the channel rim meet and are encased within the handle structure.

The handle structure comprises three main parts; namely the face shells 8 and 10, and the reenforcing member 9. Fig. 5 shows the relationship of these parts when disassembled. As seen in Figs. 3 and 6, the shell members 8 and 10 are pressed and shaped so that when they are united they form a handle of such a size and feel as to readily accommodate the hand of the holder. Fig. 6 shows the handle ready for assembly. The reinforcing member 9 is sandwiched between the shell members 8 and 10, and the flange members 12 of shell 8 are bent over and pressed to lap the flange members 14 of shell 10. This gives a rigid reinforced connection along the coacting edges of the shell members which gives both strength and beauty to the handle.

The reinforcing plate 9 is grooved throughout its full length, as shown by character 15, to accommodate the rod 4 which is attached by any suitable means at its upper end to the mirror back 1. The lower end of the rod 4 is screw threaded to receive a nut 7 of fanciful design. A cap member 6 is positioned over the lower end of the handle structure to finish off the handle member and also act as a bearing surface for the nut 7.

At the throat of the handle, which is one of the weak points of the structural organization, provision is made for strength by a double overlap construction. As shown in Fig. 4 the inner flange 11 of shell 10 is bent into a V-shape to receive the edge of the mirror and mirror back, and the outer flange 12 of shell 8 is bent over the inner flange 11 to give a double overlap arrangement. This makes a very sturdy receiving casing at the throat of the handle for the reception of the rod 4, the base of the mirror 2 and of the back 1, and the terminals of channel rim 3.

In the assembly of the device the handle is first formed by the engagement of shell members 8 and 10 in face-to-face relationship as in Fig. 6 with the reinforcing plate 9 there between. By bending and pressing the flange members 12 over the flange members 14 a complete unitary handle is formed. With the assembly of the mirror 2 and mirror back 1 by means of the channel rim 3, the completed handle is slipped over the rod 4 with the throat extending upwardly so as to receive the rod 4, the terminals of the channel rim 3, and the base of the mirror 2 and back 1. The rod 4 extends beyond the lower terminal of the handle member and is adapted to receive the cap member 6 and nut 7. By taking up on the nut 7 it is apparent that the upper portion of the vanity mirror comprising back 1, mirror 2 and channel rim 3 can be drawn down and tightly wedged within the throat of the handle member. This take-up and tightening feature necessitates a sturdy throat construction which has been provided in the present instance by a double overlap 11, 12 set forth above.

In some instances it may be desirable to further insure against twisting of the handle member relative to the through rod 4. As shown in the modification of Fig. 7 the through rod 4' may be rectangular in cross section to conform to the shape of the aperture in the bottom of the handle member.

A further modification in a detail of the invention whereby the tightening nut 7' is completely concealed is shown in Fig. 8. In this instance the cap member 6' is so designed as to completely enclose the tightening nut 7' when the cap member 6' is attached to the lower end of the handle member.

From the foregoing it will be seen that I have provided an improved construction of handle member in conjunction with a mirror, brush or the like, which permits of quick assembly and which is of sufficient rigidity to withstand the customary abuse without breakage.

I claim as my invention:

A vanity mirror or the like having a main back for the support of the mirror, a channel rim extending about the periphery of said main back having terminal portions at the base of said main back, a rod member attached to and extending downwardly from the main back between the terminal portions of the channel rim, a hollow handle member having an upstanding throat portion to receive the base of the mirror back, the rod member and the channel rim terminals, a grooved reinforcing member positioned within the hollow handle member consisting of a plate extending substantially the full length of the handle and the full width of the handle, said groove being centrally positioned at the axis of the handle, said rod member being positioned in said groove, and a take-up means associated with the rod member for wedgingly securing the base of the main back and channel rim terminals within the throat portion of the handle.

WILLIAM STEINEN.